US009478808B2

(12) United States Patent
Takei et al.

(10) Patent No.: US 9,478,808 B2
(45) Date of Patent: Oct. 25, 2016

(54) POSITIVE ACTIVE MATERIAL, POSITIVE ELECTRODE AND RECHARGEABLE LITHIUM BATTERY INCLUDING SAME

(71) Applicant: Samsung SDI Co., Ltd., Yongin-si, Gyeonggi-do (KR)

(72) Inventors: Yuki Takei, Minoh (JP); Masatsugu Nakano, Minoh (JP)

(73) Assignee: Samsung SDI Co., Ltd., Yongin-si (KR)

(*) Notice: Subject to any disclaimer, the term of this patent is extended or adjusted under 35 U.S.C. 154(b) by 252 days.

(21) Appl. No.: 14/103,701

(22) Filed: Dec. 11, 2013

(65) Prior Publication Data
US 2014/0162119 A1 Jun. 12, 2014

(30) Foreign Application Priority Data

Dec. 12, 2012 (JP) .................. 2012-271537
Sep. 26, 2013 (KR) ......... 10-2013-0114615
Dec. 11, 2013 (JP) .................. 2013-255970

(51) Int. Cl.
- H01M 4/02 (2006.01)
- H01M 4/66 (2006.01)
- H01M 4/131 (2010.01)

(Continued)

(52) U.S. Cl.
CPC .............. H01M 4/661 (2013.01); C01G 53/62 (2013.01); H01M 4/131 (2013.01); H01M 4/505 (2013.01); H01M 10/0525 (2013.01); C01P 2002/50 (2013.01); C01P 2002/60 (2013.01); C01P 2004/51 (2013.01); C01P 2004/61 (2013.01); C01P 2006/40 (2013.01); Y02E 60/122 (2013.01)

(58) Field of Classification Search
CPC .... H01M 4/661; H01M 4/131; H01M 4/505; H01M 10/0525
See application file for complete search history.

(56) References Cited

U.S. PATENT DOCUMENTS 7,927,741 B2    4/2011  Takeuchi et al.
2004/0013941 A1* 1/2004  Kobayashi ............ H01M 4/485
                                                                    429/231.1

(Continued)

FOREIGN PATENT DOCUMENTS

EP    2 357 693 A1    8/2011
EP    2 648 250 A1    10/2013

(Continued)

OTHER PUBLICATIONS

European Examination Report dated Jan. 21, 2015 for European Patent Application No. EP 13 196 778.8 which shares priority of Korean Patent Application No. KR 10-2013-0114615 with captioned U.S. Appl. No. 14/103,701.

(Continued)

*Primary Examiner* — Jonathan Jelsma
(74) *Attorney, Agent, or Firm* — Knobbe Martens Olson & Bear LLP (57) ABSTRACT

A positive active material for a rechargeable lithium battery is disclosed. The positive material includes including a lithium-manganese oxide-based solid solution including primary particles and secondary particles having a particle diameter (D50) in the range of about 1 μm to about 5 μm, a particle diameter (D90) in the range of less than about 8 μm, and a crystallite diameter of less than or equal to about 150 nm. The positive electrode for a rechargeable lithium battery includes the lithium manganese oxide-based solid solution is also disclosed.

8 Claims, 5 Drawing Sheets

(51) Int. Cl.
*H01M 4/505* (2010.01)
*H01M 10/0525* (2010.01)
*C01G 53/00* (2006.01)

(56) References Cited

U.S. PATENT DOCUMENTS

| | | | |
|---|---|---|---|
| 2009/0155691 A1 | 6/2009 | Park et al. | |
| 2010/0117025 A1* | 5/2010 | Takeuchi | H01M 4/131 |
| | | | 252/182.1 |
| 2012/0070725 A1 | 3/2012 | Venkatachalam et al. | |
| 2013/0004849 A1 | 1/2013 | Satoh | |
| 2013/0078520 A1* | 3/2013 | Toya | C01G 53/00 |
| | | | 429/223 |
| 2013/0288129 A1 | 10/2013 | Toya et al. | |

FOREIGN PATENT DOCUMENTS

| | | |
|---|---|---|
| JP | 2008-270201 A | 11/2008 |
| JP | 4213768 B2 | 1/2009 |
| JP | 4316656 B1 | 8/2009 |
| JP | 2010-047466 A | 3/2010 |
| JP | 2010-135285 A | 6/2010 |
| JP | 2012-129102 A | 7/2012 |
| KR | 10-2011-0113241 A | 10/2011 |
| KR | 10-2012-0099118 A | 9/2012 |
| KR | 10-2012-0122788 A | 11/2012 |
| KR | 10-2012-0126021 A | 11/2012 |
| KR | 10-2013-0009739 A | 1/2013 |

OTHER PUBLICATIONS

Extended European Search Report dated Mar. 25, 2014 for European Patent Application No. EP 13 196 778.8 which shares priority of application Nos. JP 2012-271537, filed Dec. 12, 2012; KR 10-2013-0114615, filed Sep. 26, 2013; and JP 2013-255970, filed Nov. 12, 2013; with captioned U.S. Appl. No. 14/103,701.

European Examination Report dated Aug. 25, 2015 for European Patent Application No. EP 13 196 778.8, which shares priority of Japanese Patent Application No. 2012-271537, filed Dec. 12, 2012; Korean Patent Application No. KR 10-2013-0114615, filed Sep. 26, 2013; and Japanese Patent Application No. 2013-255970, filed Dec. 11, 2013, with captioned U.S. Appl. No. 14/103,701.

\* cited by examiner

POSITIVE ACTIVE MATERIAL, POSITIVE ELECTRODE AND RECHARGEABLE LITHIUM BATTERY INCLUDING SAME

CROSS-REFERENCE TO RELATED APPLICATIONS

Any and all priority claims identified in the Application Data Sheet, or any correction thereto, are hereby incorporated by reference under 37 CFR 1.57. For example, this application claims the benefit of Japanese Patent Application No. 2012-271537 filed in the Japanese Patent Office on Dec. 12, 2012, Japanese Patent Application No. 2013-255970 filed in the Japanese Patent Office on Dec. 11, 2013, and Korean Patent Application No. 10-2013-0114615 filed in the Korean Intellectual Property Office on Sep. 26, 2013, the disclosures of which are incorporated herein by reference in their entirety.

BACKGROUND

1. Field

The present disclosure relates to a rechargeable lithium battery; more particularly, to a positive active material and a positive electrode for a rechargeable lithium battery.

2. Description of the Related Technology

The lithium manganese oxide-based solid solution can provide high-capacity when the battery is charged at a high voltage. Therefore, the lithium manganese oxide-based solid solution has been actively researched as a positive active material for a rechargeable lithium battery.

However, the lithium manganese oxide-based solid solution does not have high load characteristics (maintenance of discharge capacity at high C-rates) when used as positive active material for a lithium battery.

SUMMARY OF CERTAIN INVENTIVE ASPECTS

One aspect of the present disclosure relates to a positive active material for a rechargeable lithium battery having high load characteristics while maintaining high discharge capacity.

Another aspect of the present disclosure relates to a positive electrode for a rechargeable lithium battery including the positive active material.

Another aspect of the present disclosure relates to a rechargeable lithium battery including the positive electrode.

One more aspect of the present disclosure relates to a positive active material for a rechargeable lithium battery that includes a lithium manganese oxide-based solid solution including a primary particle and a secondary particle, wherein a particle diameter (D50) of the secondary particle ranges from about 1 μm to about 5 μm, a particle diameter (D90) of the secondary particle is less than about 8 μm, and a crystallite diameter is less than or equal to about 150 nm.

In some embodiments, the particle diameter (D50) of the secondary particle and the particle diameter (D90) of the secondary particle may have the following relationship satisfying the Equation 1.

$$0.5 \leq (D90 - D10)/D50 \leq 1.3 \qquad \text{Equation 1}$$

In some embodiments, the crystallite diameter of the lithium manganese oxide-based solid solution may be greater than or equal to about 40 nm and less than or equal to about 150 nm.

The lithium manganese oxide-based solid solution may be represented by the following Chemical Formula 1.

$$x\text{Li}_2\text{MnO}_3 \cdot (1-x)\text{LiMO}_2 \qquad \text{Chemical Formula 1}$$

In the above Chemical Formula 1,
M is represented by the following Chemical Formula 2, and $0.2 \leq x \leq 0.5$.

$$\text{Mn}_a\text{Co}_b\text{Ni}_c\text{M'}_d \qquad \text{Chemical Formula 2}$$

In the above Chemical Formula 2,
M' is a transition metal except Mn, Co, and Ni,
$0.2 \leq a \leq 0.5$, $0.1 \leq b \leq 0.4$, $0.2 \leq c \leq 0.5$, $0 \leq d \leq 0.5$ and $a+b+c+d=1$.

In some embodiments, the positive electrode for a rechargeable lithium battery includes a current collector; and a positive active material layer positioned on the current collector and including the positive active material.

The current collector may include roughened aluminum.

In some embodiments, the positive active material layer may further include a conductive material, and the conductive material may be carbon black.

Another aspect of the disclosed technology relates to a rechargeable lithium battery including the positive electrode; a negative electrode; and an electrolyte.

Other embodiments are included in the following detailed description.

Provided is a rechargeable lithium battery having high load characteristics (maintenance of discharge capacity at high C-rates), while maintaining high discharge capacity.

DETAILED DESCRIPTION OF CERTAIN INVENTIVE EMBODIMENTS

Hereinafter, embodiments are described in detail. However, these embodiments are exemplary, and this disclosure is not limited thereto.

Hereinafter, one example of a rechargeable lithium battery is described in FIG. 1.

Figure 1:
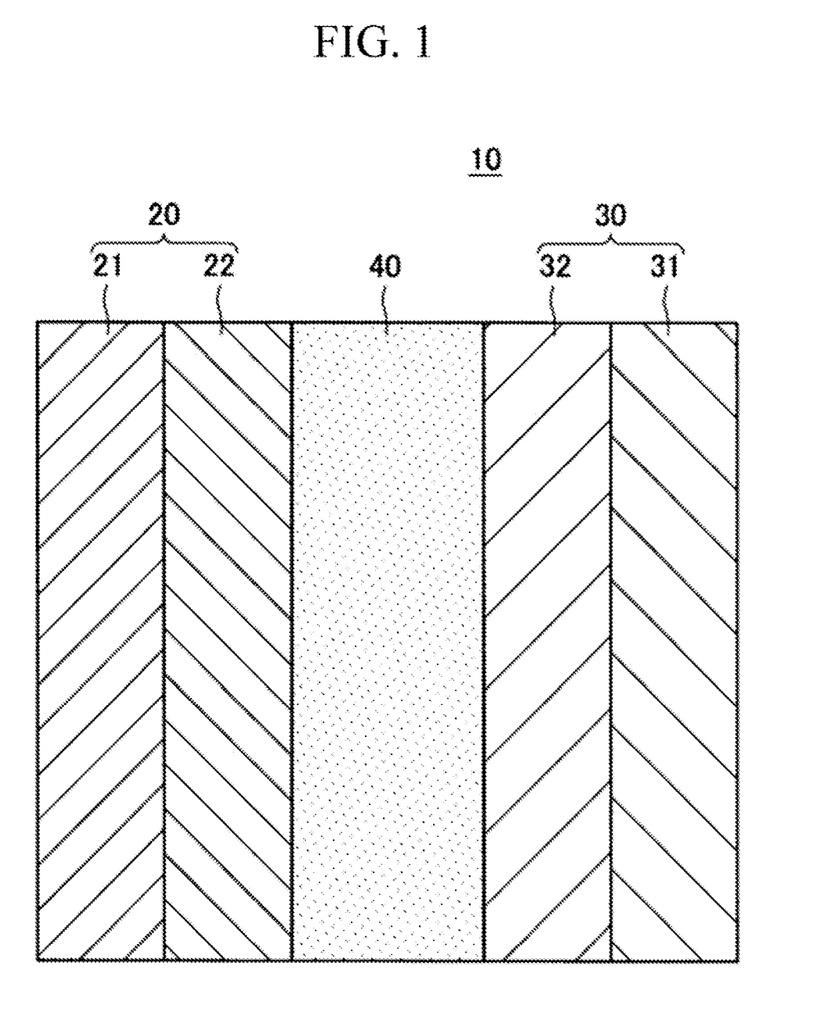
FIG. 1 is a cross-sectional view showing a schematic structure of a rechargeable lithium battery.

FIG. 1 is a cross-sectional view showing a schematic structure of a rechargeable lithium battery.

Referring to FIG. 1, the rechargeable lithium battery 10 includes a positive electrode 20, a negative electrode 30, and a separator 40 interposed between the positive electrode 20 and the negative electrode 30.

The rechargeable lithium battery may have a charge cut-off voltage (oxidation reduction potential) of, for example, about 4.5V to about 5.0V (vs. Li/Li$^+$).

The rechargeable lithium battery has no particular limit about its shape and may have a shape such as a cylinder, a prism, a laminated type, a coin-type, and the like.

The positive electrode 20 includes a current collector 21 and a positive active material layer 22 formed on the current collector 21.

The positive active material layer includes a positive active material and a conductive material, and additionally a binder.

In some embodiments, the positive active material may include a lithium manganese oxide-based solid solution.

The lithium manganese oxide-based solid solution may be a solid solution including $Li_2MnO_3$, and specifically may be represented by the following Chemical Formula 1.

$xLi_2MnO_3 \cdot (1-x)LiMO_2$   Chemical Formula 1

In the above Chemical Formula 1,

M is represented by the following Chemical Formula 2, and $0.2 \leq x \leq 0.5$.

$Mn_aCo_bNi_cM'_d$   Chemical Formula 2

In the above Chemical Formula 2,

M' is a transition metal except Mn, Co, and Ni, and may be Sc, Ti, V, Cr, Fe, Cu, Zn, Y, Zr, Nb, Mo, Tc, Ru, Rh, Pd, Ag, Cd, La, Hf, Ta, W, Re, Os, Ir, Pt, Au, Hg, Ac, Rf, Db, Sg, Bh, Hs, or a combination thereof, $0.2 \leq a \leq 0.5$, $0.1 \leq b \leq 0.4$, $0.2 \leq c \leq 0.5$, $0 \leq d \leq 0.5$, and a+b+c+d=1.

In one embodiment, M' may be Sc, Ti, V, Cr, Fe, Cu, Zn, Y, Zr, Nb, Mo, Tc, Ru, Hf, Ta, W, Re, or a combination thereof.

When the lithium manganese oxide-based solid solution is applied to a positive electrode of a rechargeable lithium battery, the lithium battery not only has high discharge capacity but also has high load. The high load characteristics are expressed by high maintenance ratio of discharge capacity at a high discharge rate relative to the discharge capacity at a low discharge rate during the discharge.

In some embodiments, the lithium manganese oxide-based solid solution may include primary particles and secondary particles formed of the agglomerated primary particles. Herein, the high load characteristics of a rechargeable lithium battery may depend on the particle diameter of the secondary particles.

Figure 2:
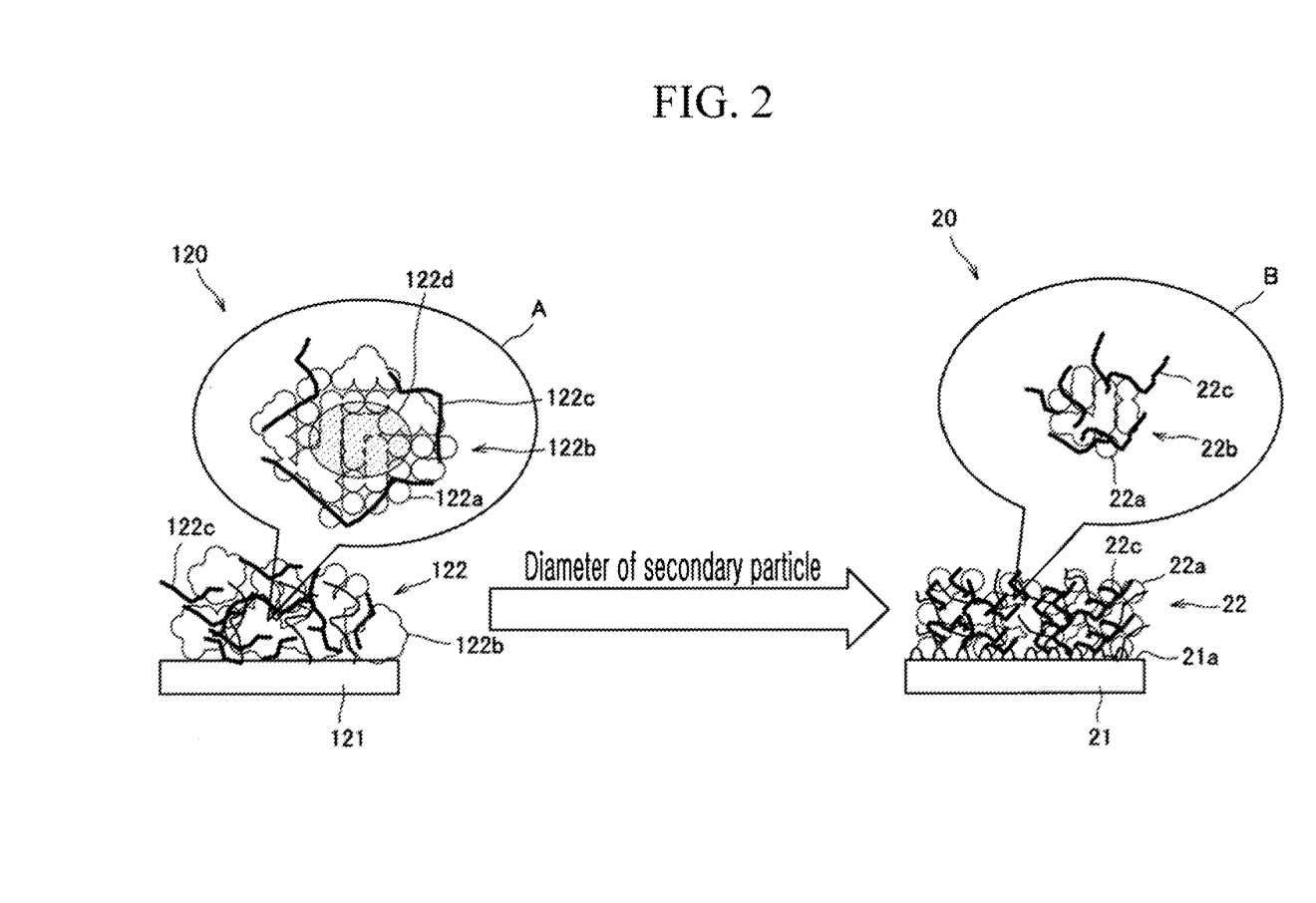
FIG. 2 is a graph showing a relationship between an average particle diameter of a secondary particle of a lithium manganese oxide-based solid solution and a reaction area of lithium ions.

This will be specifically illustrated in FIG. 2.

FIG. 2 is a graph showing a relationship between an average particle diameter of the secondary particle of a lithium manganese oxide-based solid solution and a reaction area of lithium ions.

FIG. 2 shows a conventional positive electrode for a rechargeable lithium battery 120 and a positive electrode for a rechargeable lithium battery 20.

A conventional positive electrode 120 for a rechargeable lithium battery includes a current collector 121 and a positive active material layer 122 formed on the current collector 121, and the positive active material layer 122 includes a lithium manganese oxide-based solid solution and a conductive material 122c. The lithium manganese oxide-based solid solution includes the secondary particles 122b in which the primary particles 122a are agglomerated.

The secondary particles 122b are enlarged and shown as the area A. As shown in the area A, the conventional secondary particles 122b have a very large size and thus, a smaller contact area with the conductive material 122c. In addition, the lithium manganese oxide-based solid solution has a large lattice volume and thus, a low electron conductivity rate, and accordingly, lithium ions are diffused at a very low rate in the secondary particles 122b during the discharge. Accordingly, the discharge at a high discharge rate ends before the secondary particles 122b all over the whole area finishes reacting with the lithium ions. As a result, the non-reaction area 122d is left inside the secondary particles 122b. As the non-reaction area 122d becomes larger, the discharge rate is higher. Since the non-reaction area 122d does not contribute to the discharge, the discharge capacity decreases as much as the non-reaction area. Accordingly, the high load characteristics of a conventional rechargeable lithium battery may deteriorate.

On the other hand, a positive electrode for a rechargeable lithium battery 20 as described herein includes a current collector 21 and a positive active material layer 22 formed on the current collector 21, wherein the positive active material layer 22 includes a lithium manganese oxide-based solid solution and conductive material 22c. In this lithium manganese oxide-based solid solution, primary particles 22a are agglomerated and form secondary particles 22b.

The secondary particles 22b are enlarged and shown as the area B. As shown in the area B, the secondary particles 22b have a smaller size than the conventional secondary particles 122b. Accordingly, the lithium manganese oxide-based solid solution has an increased contact area with an electrolyte and more easily reacts with lithium ions. In addition, since the secondary particles 22b have a larger contact area with a conductive material 22c than the conventional secondary particles 122b, electric conductivity of the lithium manganese oxide-based solid solution may be increased. In other words, since electrons are easily spread inside the secondary particles 22b, the diffusion rate of the lithium ions may be increased. In addition, each secondary particle 22b has a small particle diameter, and thus, lithium ions are more easily diffused all over the secondary particles 22b. Accordingly, since the non-reaction area is difficult to form even during the discharge at a high discharge rate, that is, under a high load, the high load may be increased.

Specifically, the lithium manganese oxide solid solution may include secondary particles having a particle diameter (D50) in the range of about 1 μm to about 5 μm. In addition, the secondary particles may have a particle diameter (D90) of less than about 8 μm. When the secondary particles have a particle diameter within the range, the crystallite size of the secondary particles is not disrupted but the non-reaction area is hard to form therein, and thus, high load characteristics of a rechargeable lithium battery may be increased.

Distribution of the particle diameters D10, D50, and D90 of the secondary particles may be measured using a common method, for example, in a laser diffraction-scattering method.

The particle diameter of the secondary particles indicates a diameter when the secondary particles are regarded to have a spherical shape.

The particle diameter of the secondary particles may satisfy a relationship in the following Equation 1. When the particle diameter of the secondary particles satisfies a relationship in the following Equation 1, high load characteristics may be improved.

Equation 1

$0.5 \leq (D90-D10)/D50 \leq 1.3$

In the Equation 1, each D10, D50, and D90 indicates a diameter of particles when the cumulative volume of the particles reaches 10 volume %, 50 volume %, and 90 volume % in a particle distribution.

In the Equation 1, the (D90–D10) indicates non-uniformity of particle diameters based on D50 and is an index showing whether the particle distribution is broad or sharp. The smaller the (D90–D10) is, the sharper the particle distribution is.

In some embodiments, the lithium manganese oxide-based solid solution has a small difference between particle diameters D90 and D10 and a sharp particle distribution.

The lithium manganese oxide-based solid solution may have a crystallite diameter of less than or equal to about 150 nm and specifically, greater than or equal to about 40 nm and less than or equal to about 150 nm. When the lithium manganese oxide-based solid solution has a crystallite diameter within the range, crystallite is not disrupted but the fluidity is excellent, and thus, discharge capacity of a rechargeable lithium battery may be maintained at a high level.

The crystallite indicates a single crystal having a fine size, and thus, the lithium manganese oxide-based solid solution may be an assembly of polycrystals formed of these crystallites.

Specifically, the crystallite diameter may be defined by the following Equation 2.

Equation 2

$$D=(K*\lambda)/(\beta*\cos\theta) \quad \text{Equation 2}$$

In the Equation 2,

D is a crystallite diameter,

K is a Scherrer constant, for example, 0.9, $\beta$ is a full width at half maximum (rad) of a peak around a diffraction angle by an X-ray diffraction (XRD) and the peak is a diffraction peak at a (003) plane of a crystallite, and $\theta$ is a diffraction angle (rad).

Units of the $\beta$ and $\theta$ are in radians.

In the lithium manganese oxide-based solid solution, the particle diameters D10, D50, and D90 of secondary particles may be controlled by adjusting the agitation speed and the agitation time, and the crystallite diameter of the lithium manganese oxide-based solid solution may be controlled by adjusting the agitation speed, the agitation time, the firing temperature, the firing time, and the like.

In some embodiments, the crystallite diameter of the lithium manganese oxide-based solid solution may be smaller, as the agitation speed is higher, the agitation time is shorter, the firing time is shorter, and the fire temperature is lower.

The lithium manganese oxide-based solid solution may be prepared for example in a co-precipitated method and the like methods as known in the technical fields.

Specifically, a nickel source, a manganese source and a cobalt source are dissolved in ion exchanged water, preparing a mixed aqueous solution. The nickel source may be nickel sulfate hexa(6)hydrate, nickel acetate tetrahydrate, nickel chloride hexahydrate, nickel nitrate hexahydrate, or a combination thereof, the manganese source may be manganese sulfate hepta(7)hydrate, manganese acetate tetrahydrate, manganese chloride tetrahydrate or a combination thereof, and the cobalt source may be cobalt sulfate penta(5)hydrate, cobalt acetate tetrahydrate, or cobalt nitrate tetrahydrate or a combination thereof.

The nickel source, the manganese source, and the cobalt source may be used in an amount of 10 wt % to 25 wt % based on the total amount of the mixed aqueous solution. In addition, the nickel source, the manganese source, and the cobalt source are mixed with a desired molar ratio of Ni, Co, and Mn. The molar ratio of the elements is determined according to the composition of the lithium manganese oxide-based solid solution. For example, $0.4Li_2MnO_3$-$0.6Li(Mn_{1/3}Co_{1/3}Ni_{1/3})O_2$ is prepared by using Mn:Co:Ni in a molar ratio of 60:20:20.

During the preparation of the mixed aqueous solution, a M' source may be further added. The M' source may be M-including sulfate, but it is not limited thereto. The exemplary of the M' source may be titanium sulfate, vanadium sulfate·n hydrate, iron sulfate heptahydrate, or a combination thereof.

On the other hand, ion exchanged water in a predetermined amount is put in a reaction vessel and maintained at 50° C., to prepare a reaction vessel-aqueous solution.

Subsequently, a NaOH aqueous solution (including 40 wt % of NaOH based on total weight of the NaOH aqueous solution) is added to the ion exchanged water in a dropwise fashion to adjust the pH of the reaction vessel aqueous solution to be 11.3 to 12.3. Then, the ion exchanged water was bubbled with inert gas such as nitrogen and the like to remove oxygen dissolved therein.

The reaction vessel-aqueous solution was agitated and maintained at 25° C. to 60° C., and the mixed aqueous solution was added thereto in a dropwise fashion. The rate of addition has no particular limit but may be, for example, about 1 ml/min to 10 ml/min.

The NaOH aqueous solution (including 40 wt % of NaOH based on total weight of the NaOH aqueous solution) and a $NH_3$ aqueous solution (10 wt % of $NH_3$ based on total weight of the $NH_3$ aqueous solution) are additionally added to the aqueous solution in the reaction vessel forms, and the mixture is agitated and maintained at pH of 11.3 to 12.3 to coprecipitate hydroxide of each metal element.

Herein, the agitation may be performed at predetermined speed and time. For example, the agitation speed may be in the range of about 500 rpm to about 3500 rpm, and specifically about 500 rpm to about 2000 rpm. The agitation time may be in the range of about 0.5 hours to about 100 hours, specifically about 1 hour to about 10 hours, and more specifically about 1 hour to about 4 hours. When the agitation speed and time are within the range, an average particle diameter and a crystallite diameter within the range may be obtained.

Subsequently, a solid and liquid are separated, for example, the co-precipitated hydroxide is isolated from the aqueous solution in the reaction vessel using an absorption filter and washed with ion exchanged water.

Subsequently, the co-precipitated hydroxide is vacuum-dried. The drying may be performed, for example, at about 80° C. to 150° C., and for example, for about 5 hours to 12 hours.

In some embodiments, coarse particles may be excluded from co-precipitated hydroxide during or after the vacuum-drying by using a sieving device, a centrifugation device, and the like.

After the drying, the co-precipitated hydroxide is ground for several minutes with a mortar and a pestle to obtain a dried powder. The dried powder is mixed with lithium carbonate to obtain mixed powder. Herein, the mole ratio between Li and M(Ni+Mn+Co) is determined by composition of a solid solution. For example, $0.4Li_2MnO_3$-$0.6Li(Mn_{1/3}Co_{1/3}Ni_{1/3})O_2$ is prepared by mixing in 1.4:1 of a mole ratio between Li and M.

Subsequently, the mixed powder is fired for a predetermined time at a predetermined temperature. Accordingly, the lithium manganese oxide-based solid solution may be prepared. Herein, the firing may be performed for about 4 hours to about 24 hours, and specifically about 6 hours to about 12 hours at a temperature in the range of about 800° C. to about 1150° C. and specifically, about 800° C. to about 1050° C.

The content of the lithium manganese oxide-based solid solution is not particularly limited, and may be applied in an amount to form a positive active material layer for a rechargeable lithium battery.

The conductive material may include, for example, carbon black such as ketjen black, acetylene black, and the like, natural graphite, artificial graphite, and the like but has no particular limit, as far as any material increases conductivity of a positive electrode.

The content of the conductive material is not particularly limited, and may be used in an amount used in a positive active material layer of a rechargeable lithium battery.

The binder may include, for example, polyvinylidene fluoride, an ethylene-propylene-diene terpolymer, a styrene-butadiene rubber, an acrylonitrile-butadiene rubber, a fluoro rubber, polyvinyl acetate, polymethylmethacrylate, polyethylene, nitrocellulose, and the like, but has the choice is not limited as long as any material binds the positive active material and the conductive material on the current collector 21.

The content of the binder is not particularly limited, but may be in an applicable content to a positive active material layer of a rechargeable lithium battery.

The positive active material layer 22 may be formed by, for example, dispersing the positive active material, the conductive material, and the binder in an organic solvent such as N-methyl-2-pyrrolidone, and the like to form a slurry, and coating the slurry on the current collector 21 followed by drying and compressing the same.

The current collector 21 may be, for example, aluminum and the like, specifically roughened aluminum, and the like. When the current collector is roughened aluminum, high load characteristics of a rechargeable lithium battery may be achieved.

The roughened aluminum may be a surface-roughened aluminum foil. The method of manufacturing the surface-roughened aluminum foil is may be, for example, through physical etching by sandblast, chemical etching using acid, electrochemical etching using electrolytic reaction in an acidic solution, and the like.

The coating method may include, for example, a knife coating, a gravure coating, and the like.

Subsequently, the positive active material layer is compressed using a presser to manufacture a positive electrode having a desired thickness.

The negative electrode 30 includes a current collector 31 and a negative active material layer 32 formed on the current collector 31.

The current collector 31 may be, for example copper, nickel, and the like.

The negative active material layer may be any usable negative active material layer of a rechargeable lithium battery. For example, the negative active material layer may include a negative active material, and additionally a binder.

In some embodiments, the negative active material may include, for example, artificial graphite, natural graphite, a mixture of artificial graphite and natural graphite, natural graphite coated with artificial graphite, and the like; a mixture of a particulate of silicon, tin or oxides thereof and the graphite; a silicon or tin particulate; a silicon- or tin-containing alloy; a titanium oxide-compound such as $Li_4Ti_5O_{12}$, and the like. The silicon oxide may be represented by the formula $SiO_x$ ($0<x\leq2$). In addition, lithium metal and the like may also be used.

The binder may be the same as the binder of the positive active material layer.

The mixing weight ratio of the negative active material and the binder is adjusted as needed.

The negative electrode may be manufactured according to the same method as the positive electrode.

Specifically, the negative active material and the binder are mixed at a predetermined ratio and dispersed in an organic solvent such as N-methyl-2-pyrrolidone, and the like to form slurry. Then, the slurry is coated on a current collector and dried to form a negative active material layer. Subsequently, the negative active material layer is compressed using a presser to manufacture a negative electrode having a desired thickness.

In some embodiments, when the negative active material layer is metal lithium, the current collector may be a lithium metal foil.

The separator 40 is not particularly limited, and may be any separator that is suitable for a rechargeable lithium battery. Specifically, a porous film or a non-woven fabric having excellent high-rate discharge performance may be used singularly or as a mixture.

The material of the separator may include, for example, a polyolefin-based resin such as polyethylene, polypropylene and the like; a polyester-based resin such as polyethylene terephthalate, polybutylene terephthalate, and the like; a fluorinated resin such as polyvinylidene fluoride, a vinylidene fluoride-hexafluoropropylene copolymer, a vinylidene fluoride-perfluorovinyl ether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and the like.

In some embodiments, the porosity of the separator is not particularly limited.

The separator may be impregnated with an electrolyte.

The electrolyte may be anything that is usable for a rechargeable lithium battery. Specifically, the electrolyte includes an electrolytic salt dissolved in a non-aqueous solvent.

In some embodiments, the non-aqueous solvent may be, for example, cyclic carbonates such as propylene carbonate, ethylene carbonate, butylene carbonate, chloroethylene carbonate, vinylene carbonate, and the like; cyclic esters such as γ-butyrolactone, γ-valero lactone, and the like; linear carbonates such as dimethyl carbonate, diethyl carbonate, ethylmethyl carbonate, and the like; acyclic esters such as methyl formate, methyl acetate, methyl butyrate, and the like; tetrahydrofuran or a derivative thereof; ethers such as 1,3-dioxane, 1,4-dioxane, 1,2-dimethoxyethane, 1,4-dibutoxyethane, methyl diglyme, and the like; nitriles such as acetonitrile, benzonitrile and the like; dioxolane or a derivative thereof; ethylene sulfide, a sulfolane, sultone or a derivative thereof, and the like. These may be used singularly or in a mixture of two or more.

The electrolytic salt may be, for example, an inorganic salt such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$, $KSCN$, and the like; an organic salt such as $LiCF_3SO_3$, $LiN(CF_3SO_2)_2$, $LiN(C_2F_5SO_2)_2$, $LiN(CF_3SO_2)$ $(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-malate, $(C_2H_5)_4$ N-benzoate, $(C_2H_5)_4$N-phthalate, lithium stearyl sulfonate, lithium octyl sulfonate, lithium dodecyl benzene sulfonate, and the like, and these may be used singularly or in a mixture of two or more.

The concentration of the electrolytic salt is not particularly limited, but may be specifically about 0.5 mol/L to about 2.0 mol/L.

The rechargeable lithium battery may be manufactured as follows.

The separator 40 is disposed between the positive electrode 20 and the negative electrode 30 to manufacture an electrode assembly. Subsequently, the electrode assembly is processed to have a desired shape, for example, a cylinder, a prism, a laminated type, a button-type, and the like and then, inserted into the container. Then, the above electrolyte solution is injected into the container, so that each pore of the separator may be impregnated with the electrolyte.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

Examples 1 to 7 and Comparative Examples 1 to 6

Preparation of Lithium Manganese Oxide-based Solid Solution

A mixed aqueous solution was prepared by dissolving nickel sulfate hexahydrate, manganese sulfate heptahydrate, and cobalt sulfate pentahydrate in ion exchanged water. Herein, the total amount of the nickel sulfate hexahydrate, the manganese sulfate heptahydrate, and the cobalt sulfate pentahydrate was included in an amount of 20 wt % based on total amount of the mixed aqueous solution. In addition, the nickel sulfate hexahydrate, manganese sulfate heptahydrate, and cobalt sulfate pentahydrate were mixed so that an element molar ratio of Mn:Co:Ni might be 60:20:20.

Ion exchanged water (500 ml) was put in a reaction vessel and maintained at 50° C. A NaOH aqueous solution (including 40 wt % of NaOH based on the total weight of the NaOH aqueous solution) was added to the ion exchanged water in a dropwise fashion to adjust pH of the aqueous solution in the reaction vessel to be 11.5 to prepare a reaction vessel-aqueous solution. Subsequently, the ion exchanged water was bubbled with nitrogen gas to remove oxygen dissolved therein.

The reaction vessel-aqueous solution was agitated and maintained at 50° C., and the mixed aqueous solution was added dropwise at a speed of 3 ml/min to the reaction vessel. In addition, a NaOH aqueous solution (including 40 wt % of NaOH based on the total weight of the NaOH aqueous solution) and a $NH_3$ aqueous solution (including 10 wt % of $NH_3$ based on the total weight of the $NH_3$ aqueous solution) were additionally added thereto to maintain the pH of the reaction vessel-aqueous solution at 11.5 to prepare a reaction layer aqueous solution. The reaction layer aqueous solution was agitated, at a speed of 2000 rpm for a time shown in Table 1. The hydroxide of each metal element was thus co-precipitated.

Subsequently, the co-precipitated hydroxides were isolated from the reaction layer aqueous solution with an absorption filter and washed with ion exchange water. Then, the co-precipitated hydroxides was vacuum-dried. The vacuum-drying was performed at 100° C. for 10 hours.

Subsequently, the dried co-precipitated hydroxide was ground with a mortar and a pestle and dried to obtain a dried powder. The dried powder was mixed with lithium carbonate, yielding a mixed powder. The molar ratio of metals used in the mixing of the dried powder and the lithium carbonate (Li and M (Ni+Mn+Co)) was 1.4:1.

Subsequently, the mixed powder was divided into the following Examples 1 to 7 and Comparative Examples 1 to 6, and each sample was fired. Herein, all the samples were performed for 10 hours by changing the firing temperature in the range of 800° C. to 1150° C. In other words, each sample was respectively fired at a different temperature as shown in the following Table 1, preparing lithium manganese oxide-based solid solutions according to Examples 1 to 7 and Comparative Examples 1 to 6.

TABLE 1

| | Examples | | | | | | | Comparative Examples | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Agitation speed (rpm) | 2000 | 2000 | 2000 | 2000 | 2000 | 2000 | 2000 | 2000 | 2000 | 2000 | 2000 | 3500 | 3000 |
| Agitation time (hr) | 3 | 3 | 2 | 3 | 3 | 4 | 2 | 5 | 5 | 8 | 5 | 6 | 7 |
| Firing temperature (° C.) | 850 | 900 | 900 | 1000 | 1050 | 850 | 800 | 850 | 900 | 900 | 1000 | 1050 | 1150 |
| Firing time (hr) | 10 | 10 | 10 | 10 | 10 | 10 | 10 | 10 | 10 | 10 | 10 | 10 | 10 |

Manufacture of Rechargeable Lithium Battery Cell

Each lithium manganese oxide-based solid solution was mixed with acetylene black and polyvinylidene fluoride in a weight ratio of 80:13:7. This mixture was dispersed into N-methyl-2-pyrrolidone to prepare a slurry. The slurry was coated and dried on an aluminum foil as a current collector to form a positive active material layer, and the positive active material layer was compressed to have a thickness of about 50 μm to provide a positive electrode.

The negative electrode was manufactured by mounting a metal lithium foil on a copper foil as a current collector.

As for a separator, a 12 μm-thick porous polyethylene film was used and disposed between the positive and negative electrodes, manufacturing an electrode assembly.

Subsequently, the electrode assembly was manufactured into a size of a CR2032 coin half-cell and inserted in a CR2032 coin half-cell container.

The electrolyte solution was prepared by mixing ethylene carbonate and dimethyl carbonate in a volume ratio of 3:7 to prepare a non-aqueous solvent and dissolving lithium hexafluorophosphate in a concentration of 1.00 mol/L.

The electrolyte solution was injected into the coin half-cell container and thus, impregnated into the separator, manufacturing a rechargeable lithium battery cell.

Evaluation 1: Measurement of Particle Diameter and Crystallite Diameter of Lithium Manganese Oxide-based Solid Solution The particle diameters D10, D50 and D90 of secondary particles of the lithium manganese oxide-based solid solutions according to Examples 1 to 7 and Comparative Examples 1 to 6 were measured using a laser diffraction scattering particle distribution measuring equipment (Nikkiso Co., Ltd., Japan, Microtrac MT3000), and the results are shown in the following Table 2.

In addition, the crystallite diameter of the lithium manganese oxide-based solid solutions according to Examples 1 to 7 and Comparative Examples 1 to 6 were measured, and the results are provided in the following Table 2 and FIG. 3.

When an X-ray diffraction test was performed about the lithium manganese oxide-based solid solutions, a peak around a diffraction angle of 18° was observed. The crystallite diameter was obtained by using a diffraction angle and a full width at half maximum of the peak and also, the following Equation 2.

$$D = (K^*\lambda)/(\beta^*\cos\theta)$$ Equation 2

In the Equation 2, D is a crystallite diameter, K is 0.9, $\beta$ is a full width at half maximum (rad) of a peak around a diffraction angle by an X-ray diffraction (XRD) and the peak is a diffraction peak at a (003) plane of crystallite, and $\theta$ is $18/360^*2\pi$ (rad).

Figure 3:
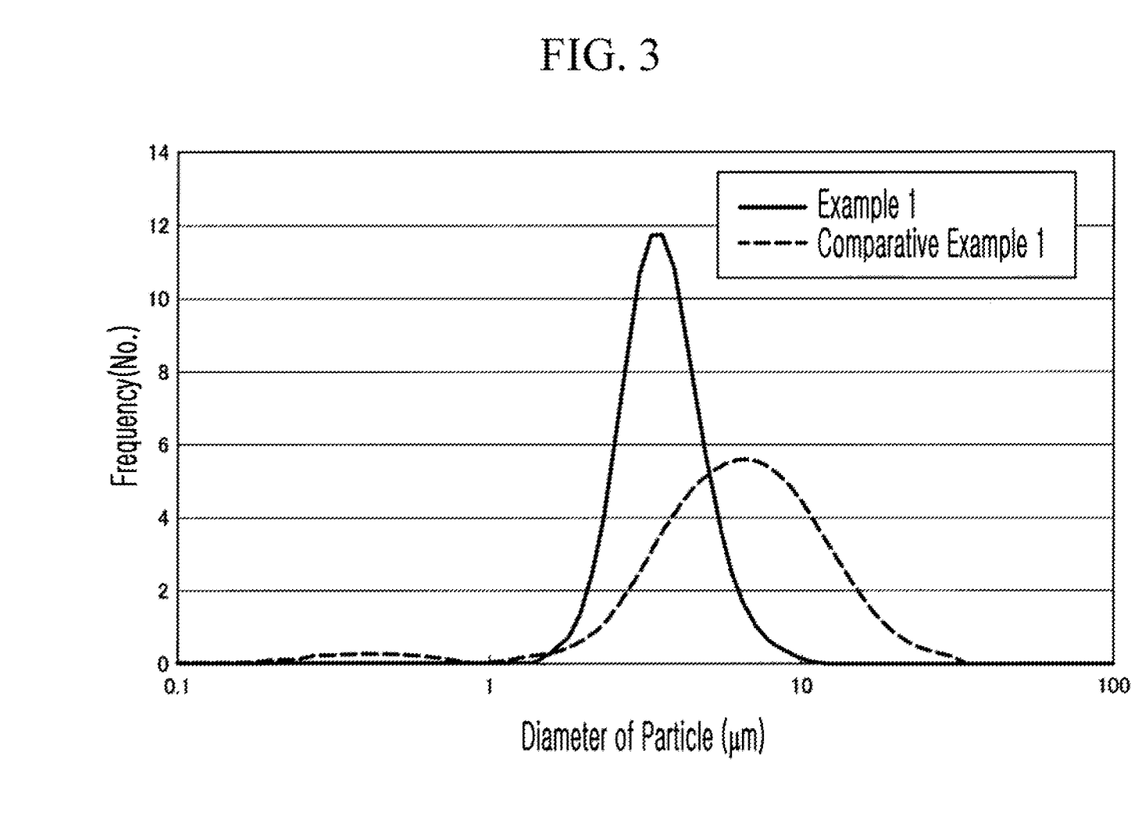
FIG. 3 is a graph showing size distribution of the particle the lithium manganese oxide-based solid solution according to Example 1 and Comparative Example 1.

FIG. 3 is a graph showing the particle distribution of the lithium manganese oxide-based solid solution according to Example 1 and Comparative Example 1.

Referring to FIG. 3, the particle distribution of Example 1 is sharper than that of Comparative Example 1.

TABLE 2

| | Crystallite diameter (nm) | Particle diameter of secondary particle (μm) | | | (D90-D10)/D50 |
|---|---|---|---|---|---|
| | | D10 | D50 | D90 | |
| Example 1 | 60 | 2.1 | 3.2 | 4.8 | 0.8 |
| Example 2 | 90 | 3.0 | 3.9 | 5.1 | 0.5 |
| Example 3 | 80 | 0.6 | 1.5 | 2.5 | 1.3 |
| Example 4 | 120 | 2.6 | 3.6 | 5.2 | 0.7 |
| Example 5 | 150 | 2.5 | 3.6 | 5.3 | 0.8 |
| Example 6 | 60 | 2.1 | 4.8 | 7.5 | 1.1 |
| Example 7 | 40 | 1.0 | 2.2 | 3.8 | 1.3 |
| Comparative Example 1 | 60 | 2.7 | 6.0 | 12.8 | 1.7 |
| Comparative Example 2 | 80 | 4.9 | 6.5 | 9.3 | 0.7 |
| Comparative Example 3 | 90 | 7.2 | 11.3 | 17.7 | 0.9 |
| Comparative Example 4 | 150 | 4.9 | 6.5 | 9.3 | 0.7 |
| Comparative Example 5 | 200 | 2.1 | 3.2 | 4.8 | 0.8 |
| Comparative Example 6 | 300 | 0.7 | 1.6 | 3.2 | 1.6 |

Evaluation 2: Charge and Discharge Characteristics of Rechargeable Lithium Battery The charge and discharge evaluation of the rechargeable lithium battery cells according to Examples 1 to 7 and Comparative Examples 1 to 6 was performed as in the following Table 3.

TABLE 3

| Cycle Number | Charge Rate | Discharge Rate | Cut-Off Voltage (V) |
|---|---|---|---|
| 1 | 0.1 C CC-CV | 0.1 C CC | 4.7-2.0 |
| 2 | 0.2 C CC-CV | 0.2 C CC | 4.6-2.5 |
| 3 | 0.2 C CC-CV | ⅓ C CC | 4.6-2.5 |
| 4 | 0.2 C CC-CV | 1 C CC | 4.6-2.5 |
| 5 | 0.2 C CC-CV | 2 C CC | 4.6-2.5 |
| 6 | 0.2 C CC-CV | 3 C CC | 4.6-2.5 |
| 7 | 0.2 C CC-CV | 5 C CC | 4.6-2.5 |

In Table 3, the CC-CV indicates a constant current and constant voltage charge, and the CC indicates a constant current discharge. The cut-off voltage indicates a voltage when the charge and discharge end. For example, the charge was performed to a voltage of 4.7V of the rechargeable lithium battery cells, and the discharge was performed to a voltage of 2.0 V of the rechargeable lithium battery cells in the 1st cycle.

As shown in Table 3, the lithium manganese oxide-based solid solution was charged and discharged for an activation treatment at the first cycle. Then, the high load characteristics of the lithium manganese oxide-based solid solution were evaluated as the discharge rate was increased, and the results are provided in the following Table 4 and FIGS. 4 and 5.

In the following Table 4, the capacity retention (%) was obtained as a percentage of discharge capacity during the 3C discharge relative to discharge capacity during the 0.2C discharge.

TABLE 4

| | Discharge capacity | | Capacity |
|---|---|---|---|
| | 0.2 C (mAh/g) | 3 C | retention (%) (3 C/0.2 C) |
| Example 1 | 241 | 191 | 79 |
| Example 2 | 276 | 228 | 82 |
| Example 3 | 280 | 235 | 84 |
| Example 4 | 212 | 168 | 79 |
| Example 5 | 235 | 185 | 79 |
| Example 6 | 272 | 212 | 78 |
| Example 7 | 249 | 212 | 85 |
| Comparative Example 1 | 242 | 159 | 66 |
| Comparative Example 2 | 233 | 136 | 58 |
| Comparative Example 3 | 258 | 141 | 54 |
| Comparative Example 4 | 240 | 150 | 63 |
| Comparative Example 5 | 210 | 140 | 67 |
| Comparative Example 6 | 200 | 145 | 73 |

Figure 4:
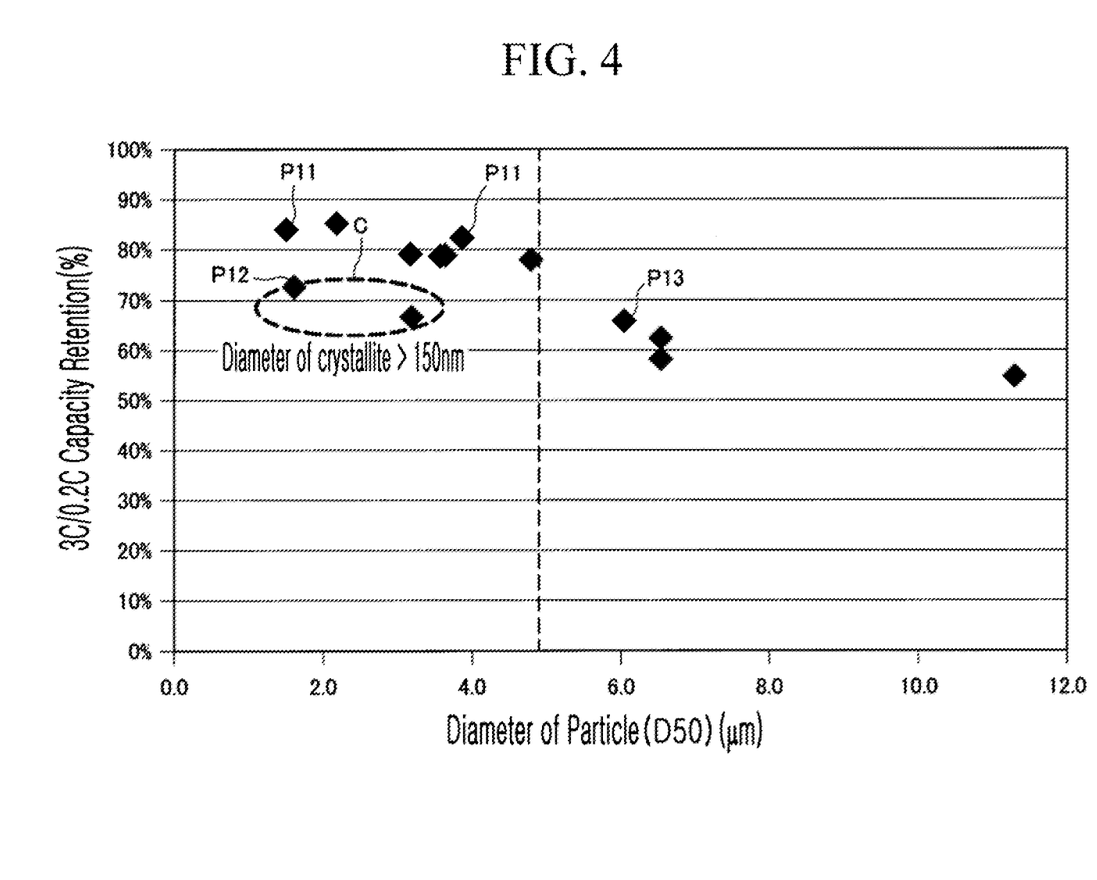
FIG. 4 is a graph showing the relationship between the average particle diameter (D50) of a lithium manganese oxide-based solid solution and capacity retention.

FIG. 4 is a graph showing the relationship between an average particle diameter (D50) of a lithium manganese oxide-based solid solution and capacity retention.

In FIG. 4, a point P11 indicates measurement values of Examples 1 to 7, a point P12 in an area C indicates measurement values of Comparative Examples 5 and 6, and a point P13 corresponding to D50 of greater than or equal to 5 μm indicates measurement values of Comparative Examples 1 to 4.

Figure 5:
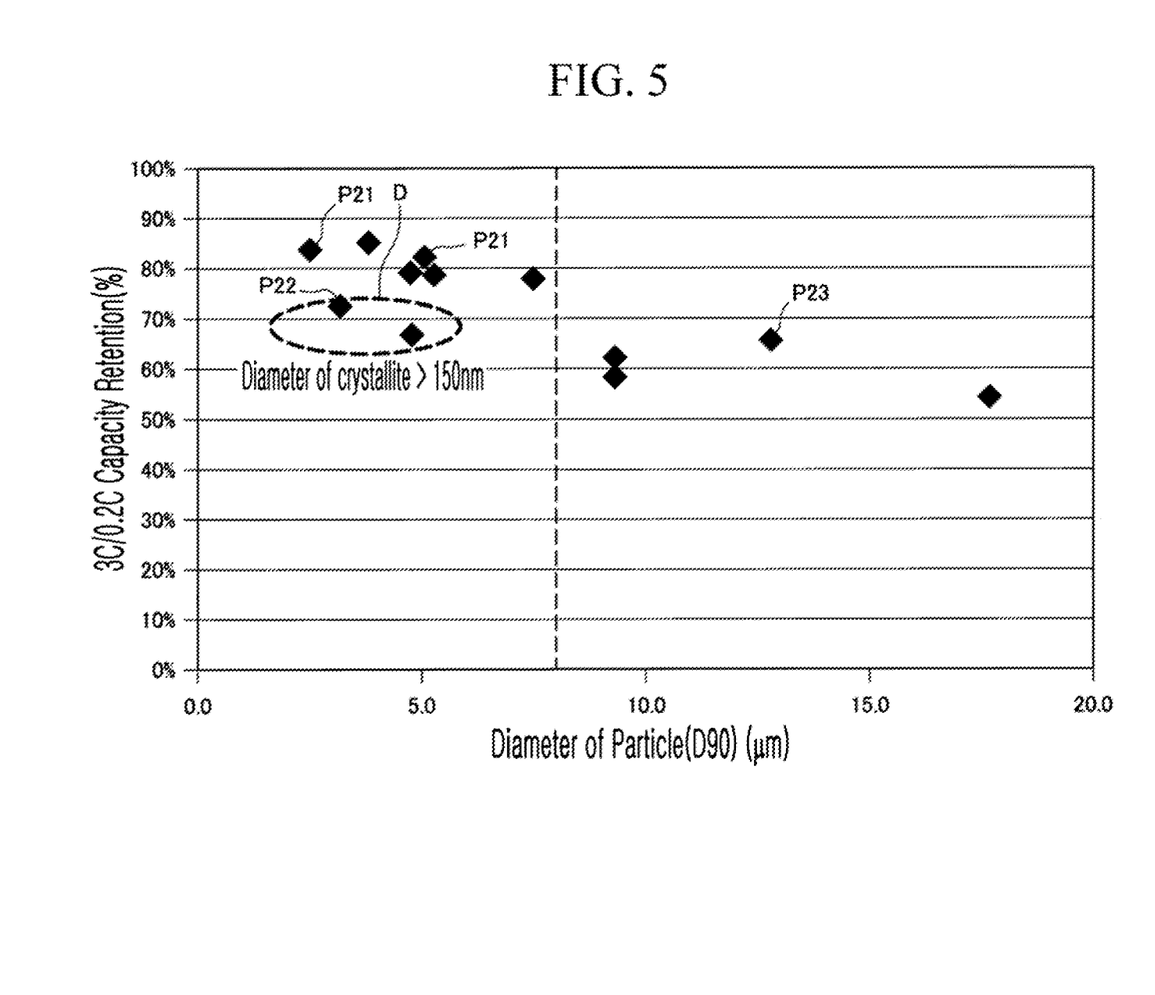
FIG. 5 is a graph showing the relationship between an average particle diameter (D90) of a lithium manganese oxide-based solid solution and capacity retention.

FIG. 5 is a graph showing the relationship between an average particle diameter (D90) of a lithium manganese oxide-based solid solution and capacity retention.

In FIG. 5, the point P21 indicates measurement values of Examples 1 to 7, the point P22 in an area D indicates measurement values of Comparative Examples 5 and 6, and the point P23 corresponding to D90 of greater than or equal to 8 μm indicates measurement values of Comparative Examples 1 to 4.

Referring to Table 4 and FIGS. 4 and 5, Examples 1 to 7 showed high discharge capacities and capacity retention when lightly loaded (during the 0.2C discharge), while Comparative Examples 1 to 4 having an average particle diameter out of the range showed deteriorated capacity retention, and Comparative Examples 5 and 6 having a crystallite diameter outside the range showed deteriorated discharge capacity as well as deteriorated capacity retention when lightly loaded.

Accordingly, when the lithium manganese oxide-based solid solution described herein was used as a positive active material for a rechargeable lithium battery, the discharge capacity was not only almost entirely maintained and also high load characteristics were also improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material for a rechargeable lithium battery comprising a lithium manganese oxide-based solid solution comprising
    a primary particle and a secondary particle,
    wherein the primary particles are agglomerated and form the secondary particles,
    wherein a particle diameter (D50) of the secondary particle is in the range of about 1 μm to less than 5 μm,
    a particle diameter (D90) of the secondary particle is less than about 8 μm, and
    a crystallite diameter as measured by the Scherrer equation is less than or equal to about 150 nm; and
    wherein the particle diameter (D50) of the secondary particle and the particle diameter (D90) of the secondary particle have a relationship satisfying the following Equation 1:

0.7≤(D90−D10)/D50≤1.3.

2. The positive active material of claim 1, wherein the crystallite diameter of the lithium manganese oxide-based solid solution is greater than or equal to about 40 nm and less than or equal to about 150 nm.

3. The positive active material of claim 1, wherein the lithium manganese oxide-based solid solution is represented by the following Chemical Formula 1:

$x$Li$_2$MnO$_3$·(1−$x$)LiMO$_2$    Chemical Formula 1 wherein,
    M is represented by the following Chemical Formula 2 and 0.2≤x≤0.5, Mn$_a$Co$_b$Ni$_c$M'$_d$    Chemical Formula 2 wherein,
    M' is a transition metal except Mn, Co, and Ni,
    0.2≤a≤0.5, 0.1≤b≤0.4, 0.2≤c≤0.5, 0≤d≤0.5, and a+b+c+d=1.

4. A positive electrode for a rechargeable lithium battery comprising
    a current collector; and
    a positive active material layer positioned on the current collector and comprising the positive active material of claim 1.

5. The positive electrode of claim 4, wherein the current collector comprises roughened aluminum.

6. The positive electrode of claim 4, wherein the positive active material layer further comprises a conductive material, and wherein the conductive material comprises carbon black.

7. A rechargeable lithium battery comprising
    the positive electrode of claim 4;
    a negative electrode; and
    an electrolyte.

8. The positive active material of claim 1, wherein the lithium manganese oxide-based solid solution is prepared in a co-precipitated method.

* * * * *